United States Patent
Najman

(10) Patent No.: US 12,007,616 B2
(45) Date of Patent: Jun. 11, 2024

(54) PIPE CABLE RING CLAMP AND THE SERIES OF PIPE CABLE RING CLAMP INSTALLATION APPARATUSES

(71) Applicant: GWB.CZ S.R.O., Petrkovice (CZ)

(72) Inventor: Michal Najman, Petrvald (CZ)

(*) Notice: Subject to any disclaimer, the term of this patent is extended or adjusted under 35 U.S.C. 154(b) by 850 days.

(21) Appl. No.: 16/972,596

(22) PCT Filed: Jul. 22, 2019

(86) PCT No.: PCT/CZ2019/000033
§ 371 (c)(1),
(2) Date: Dec. 6, 2020

(87) PCT Pub. No.: WO2020/025071
PCT Pub. Date: Feb. 6, 2020

(65) Prior Publication Data
US 2021/0247582 A1    Aug. 12, 2021

(30) Foreign Application Priority Data

Jul. 30, 2018 (CZ) ................................ CZ2018-382

(51) Int. Cl.
*G02B 6/44*     (2006.01)
*G02B 6/50*     (2006.01)

(52) U.S. Cl.
CPC ........... *G02B 6/4459* (2013.01); *G02B 6/508* (2013.01)

(58) Field of Classification Search
CPC .... G02B 6/508; G02B 6/4471; G02B 6/4459; G02B 6/54; H02G 3/32; F16L 55/18; F16L 3/227
See application file for complete search history.

(56) References Cited

U.S. PATENT DOCUMENTS 2,390,232 A * 12/1945 Venditty ................ F16L 33/12
                                                 24/71 ST
4,647,251 A *  3/1987 Gale ...................... H02G 1/088
                                                 405/183.5
(Continued)

*Primary Examiner* — Seahee Hong
(74) *Attorney, Agent, or Firm* — Patshegen IP; Moshe Pinchas

(57) ABSTRACT

The pipe cable ring clamp (1) comprising a coiled flat clip band (11) provided with transverse slots (111) on which at least one cable holder (4) is attached and comprising the outer coil (112) and the inner coil (113), and a strap lock (12) in which the clip band (11) is fastened, wherein the inner coil (113) of the clip band (11) is slidably mounted in the strap lock (12) and the strap lock (12) includes lock springs (139) coupled to the inner coil (113) of the clip band (11). The lock springs (139) are received in the strap lock (12) along the edges of the clip band (11) outside the contour of its perpendicular projection into the cylindrical surface of the pipe (5), the lock springs (139) are via the inner coil (113) of the clip band (11) coupled by the movable member (127) slidably mounted in the strap lock (12), wherein the movable member (127), on its end opposite to the rear wall (125) of the strap lock (12) is provided with spring stops (129) on which the lock springs (139) rest with one end thereof, while the other ends rest on the rear wall (125) of the strap lock (12) and wherein the movable member (127) is coupled to the inner coil (113) of the clip band (11) by a pusher tongue (133) in the pivotally mounted movable member (127), wherein the movable member (127) is adapted both to fix it in the rear position while compressing the lock springs (139) and to release it using the latch (135) slidably mounted in a vertical direction in the body of the movable member (127). It is also the basis of the series of pipe cable ring clamp installation apparatus invention.

7 Claims, 14 Drawing Sheets

(56) References Cited

U.S. PATENT DOCUMENTS

| | | | | |
|---|---|---|---|---|
| 5,704,098 A | * | 1/1998 | Calmettes | F16L 33/02 |
| | | | | 24/19 |
| 6,418,591 B1 | * | 7/2002 | Hecht | F16L 3/227 |
| | | | | 24/19 |
| 6,467,133 B1 | * | 10/2002 | Chen | A43C 11/1466 |
| | | | | 24/71 SK |

* cited by examiner

PIPE CABLE RING CLAMP AND THE SERIES OF PIPE CABLE RING CLAMP INSTALLATION APPARATUSES

FIELD OF THE INVENTION

The present invention falls within the field of cable and conduit installation and relates to the design of the cable clamp and the series of apparatuses for its installation.

BACKGROUND OF THE INVENTION

A number of solutions are known for the installation of fiber optic cables in a sewer network, for example, the JPH05272664 file describes the embodiment of cable fixation in pipes by means of pre-locked horseshoe-shaped holders made of flat material and fixed along the pipe walls with the open portion facing down. These holders are held against the wall of the pipe only by the force of their pre-tensioning and are set into the pipe by inverted T-shaped segments detachably secured by means of locks to the holders on the ends of their arms, which pull the horseshoe shape to a diameter smaller than the diameter of the pipe and which are connected with a pull cord. Upon delivery of the holders to the designated location in the pipe, the T-segments are disconnected from the holders by pulling them out in one direction using the pull cord. The mounting method of the brackets is very complex and the reliability of their attachment to a particular location is very problematic, among other things due to the apparently weak expansion force of the brackets given only by the pre-tension of the material used. Another embodiment of a fastener, by means of which the optical cables can be held in the waste pipe, is known, for example, from the EP953162 file. This fastening element consists of a pre-tensioned stainless steel ring which presses against the inner wall of the waste pipe and which is transported and fixed to the designated location by a remote-controlled robot. However, this solution cannot be used for pipes smaller than 200 mm in diameter. The EP1271728 file describes a similar fastener but made of elastically expandable thermoplastic material which is stretched using hot water or steam. The amount of the pressing force holding the fastener in the appropriate place is questionable, further, this design considerably reduces the inner diameter of the pipe, and the dismantling thereof, or re-installation of the cables is virtually impossible. A similar embodiment of cable attachment system is described in the JP2002250849, JPH06339216 and GB2345388 files, where cable attachment is performed by special foam either at the top or bottom of the pipe. These solutions are unsuitable for small pipe diameters, because they greatly reduce its usable diameter, and in these cases, the addition of another cable or its uninstallation or reinstallation is very problematic, since the foam coating must first be removed and only then can these operations be performed, which basically means a completely new installation. Another possible solution described in the JPH10110464 document is the use of a special pipe with a built-in integrated bracket created at the production stage. However, such a solution is usable and feasible only when setting up new buildings with a newly laid pipeline network and is therefore unusable for existing conventional pipelines installed previously. Cable laying solutions are also known to be performed by attaching special fasteners to the inner wall of the pipe by drilling, which can result in disrupting the integrity of pipe material and risk of pipe damage or rupture. The DE19825325 file introduces a solution for laying optical cables by means of a longitudinally folded hose made of fabric or gel material, with optical cables attached to its outer surface. The hose material is impregnated with a thermosetting or UV curing resin. After insertion into the pipe, the hose is stretched and pressed against the inner surface of the pipe by compressed air and subsequently cured by heat or UV radiation. Any revision of the placement of the fiber optic cables, their exchange or addition of another cable is impossible. The resistance of the material of the inserted hose against mechanical or chemical influences given by the internal environment of the waste pipe is also questionable. The EP0936479 document describes a clamp, which has a clamping fixture based on a flat coiled clip band with transverse slots, which is anchored in a clamp at one end, then encircles the inner surface of the pipe and the other end is again inserted into the clamp with a clamping closure furnished with a releasable latching element. The clamping closure is equipped with spring acting through its mechanism on the clamping band expansively, whereby the clamp is affixed around the inner wall of the pipe. However, this solution is intended for pipes with a diameter of 200 mm and larger, also with respect to the dimensions of the clamping closure, which considerably reduces the pipe diameter, this is also due to the positioning of the springs above the clamping band and, furthermore, due to the installation concept described in EP0978743, feasible only in straight sections of backbone routes of waste pipeline systems. Further examples of robots for installing fiber optic cable fasteners in waste pipes are described, for example, in the JP2000350322 and JP2002095120 documents. A common feature of these solutions is that they can only be used in the main line of waste pipes with pipe diameter ranging from 200 to 800 mm, which, in bends and in straight sections, have inspection shafts built at regular intervals. The installation of the fastening elements is carried out by placing the service car over the shaft, the operator descending and inserting the installation robot it into the pipe; the robot then transporting clamps or other fasteners to the installation site, however only in straight sections of the pipeline. Due to high construction demands on robots used for installations of cable fasteners, there is currently no known way to facilitate optical cable installations in the end branches of waste pipelines, where the terminal house connections have the diameter of 150 mm and the bends have 90° angles. The robots usually weight over 100 kg with overall length of 1500 mm, therefore inserting the robot into working position entails inserting the individual parts of the robot into the pipe and there assembling them into one unit. This process places high demands on both the time and the skills of technicians.

The goal of the presented invention is to introduce a pipe cable ring clamp and a series of pipe cable ring clamp installation apparatuses for installing optical cable to terminal sewer connections of less than 200 mm in diameter with 90° bend angles, even in places that are not accessible by sewer shafts.

SUMMARY OF THE INVENTION

The object is achieved by an invention, which is a pipe cable ring clamp comprising of a coiled flat clip band provided with transverse slots on which at least one cable holder is affixed and which consists of an outer coil, an inner coil, and a band lock in which the clip band is fastened, where the inner coil of the clip band is slidably mounted in the band lock body and the band lock contains compression springs coupled with the inner coil of the clip band. The essence of the invention is that the springs are mounted in a band lock along the edges of the clip band outside the contour of its perpendicular projection into the cylindrical surface of the conduit, while the push springs are coupled to the inner coil of the clip band by a movable member installed in the band lock, where the movable member, at the end opposite to the rear wall of the band lock, is equipped with spring stops, which support the springs one end, while the other end is supported by the rear wall of the band lock and where the travel member is coupled to the inner coil of the clip band by means of a pusher tongue mounted in a rocking manner in the movable member; the movable member is adapted to fixate it in the rear position when the springs are compressed and to release it by a latch slidably mounted in the vertical direction in the body of the movable member.

In a preferred embodiment, the cross-section of the band lock has a vertical plane perpendicular to the longitudinal axis of the pipe in the shape of an annular segment, wherein the band lock is provided with an internal cavity in which the movable member is slidably mounted.

Furthermore, it is favorable if the pivotally mounted pusher tongue in the movable member is, at its end facing towards the end of the travel member, provided with spring stops with an upwardly directed barb engaged in one of the transverse slots of the clip band; while the pusher tongue is being pushed upward by the pre-tensioned pusher element mounted in the movable member.

In a further preferred embodiment, the latch is mounted vertically in an open-bottom latch cavity formed in the movable member, wherein a latch spring mounted in the latch cavity also abuts the upper latch surface, wherein a through latch hole is formed in the bottom of the internal cavity, the dimensions of which correspond to the dimensions of the respective latch portion with which they are compatible.

It is a further object of the present invention to provide a series of apparatuses for installing a pipe cable ring clamp which is adapted to move through a pipe comprising a support body and an expander mechanism with a clamp gear, in which individual devices can be coupled to each other in any number of units where the support body of each device is provided with a clamp bed for receiving the clamp lock of the pipe cable ring clamp, wherein the clamp lock is secured on the clamp bed by being clamped between the jaws of the jaw mechanism, where the shape and dimensions of the clamping seat are corresponding to the shapes and dimensions of the clamp lock, and where the launching drive for installing the pipe cable ring clamp in the conduit is mounted under the clamp bed, and a through launch hole with dimensions and position corresponding to the shape and position of the movable member latch is formed in the clamp bed surface of movable member of the pipe cable ring clamp band lock, and the launching drive is provided with a launching pin whose dimensions and location correspond to the dimensions and position of the launching hole, the device being provided with an extending strut mechanism with at least one extending strut.

It is furthermore advantageous if the jaw mechanism of the device is formed by two opposing jaws mounted counter-slidably in an axis parallel to the longitudinal axis of the device, where the jaws abut the front and rear edges of the clamp seat bed, exceeding the upper edge thereof, and are coupled with the jaw drive mounted in the supporting body of the apparatus.

In a further preferred embodiment, the supporting body is provided with an undercarriage with which it is coupled to provide movement of the device through the pipe, and which is provided with main movement wheels mounted on wheel shafts of drive motors, which are mounted independently slidably in vertical direction relative to the supporting body; while their vertical movement is controlled by lifting motors.

The present invention achieves a new and higher effectivity in that the pipe cable ring clamp does not overly reduce the lightness of the pipe and is thus also usable in pipes of smaller diameters, is reliable and simple to manufacture and therefore inexpensive due to the small number of components. The installation apparatus is light and easy to operate and is relatively easy to manufacture to custom fit a pipe, even of small diameters, in which it can move easily even in turns and bends.

BRIEF DESCRIPTION OF THE DRAWINGS

Specific embodiments of the invention are shown schematically in the accompanying drawings wherein.

The drawings illustrating the present invention and the following examples of a particular embodiment do not in any way limit the scope of protection defined in the definition, but merely illustrate the invention.

EXAMPLES OF PREFERRED EMBODIMENTS

Figure 1:
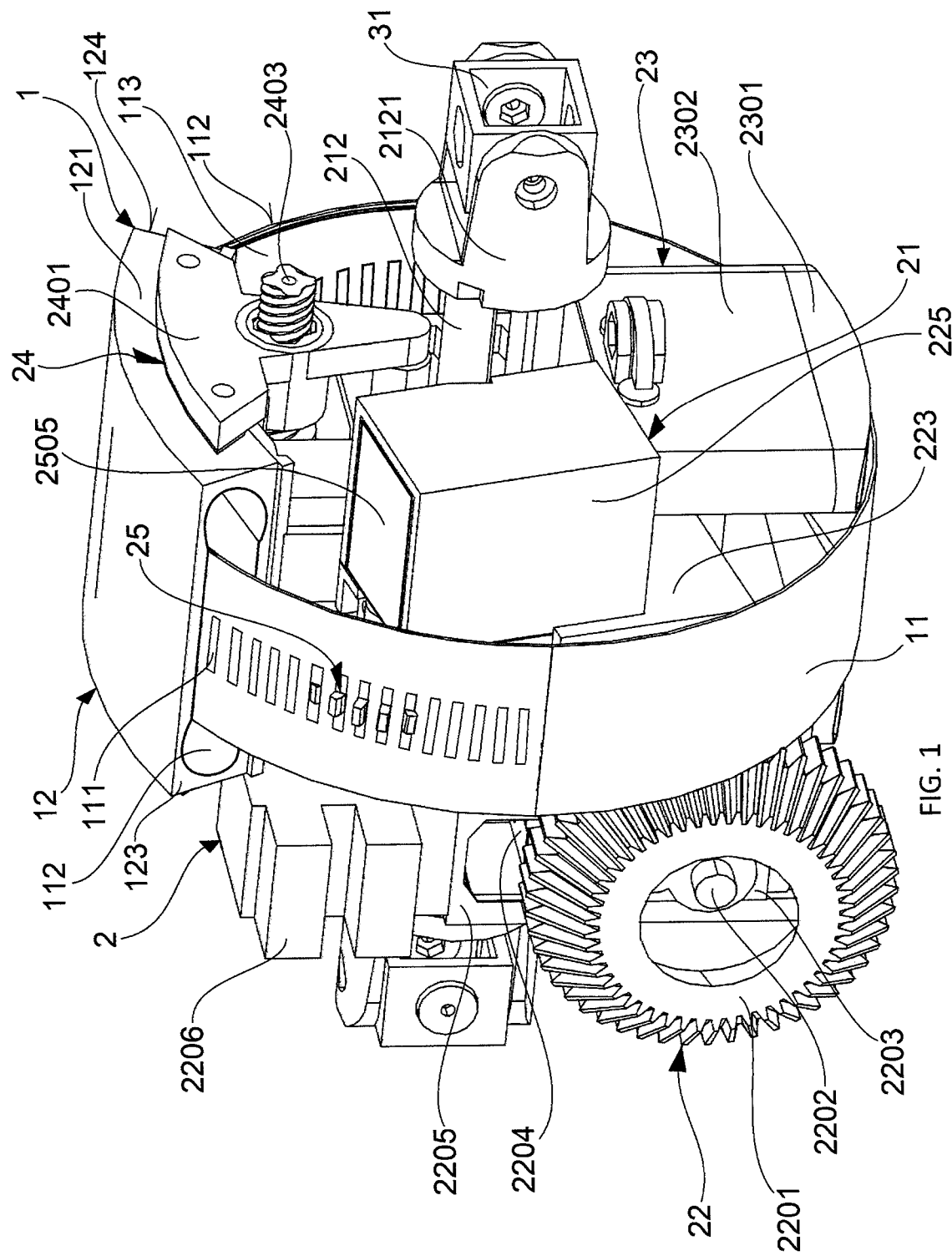
FIG. 1 is an overall left rear upper axonometric view of the pipe cable ring clamp mounted on the installation apparatus.
Figure 2:
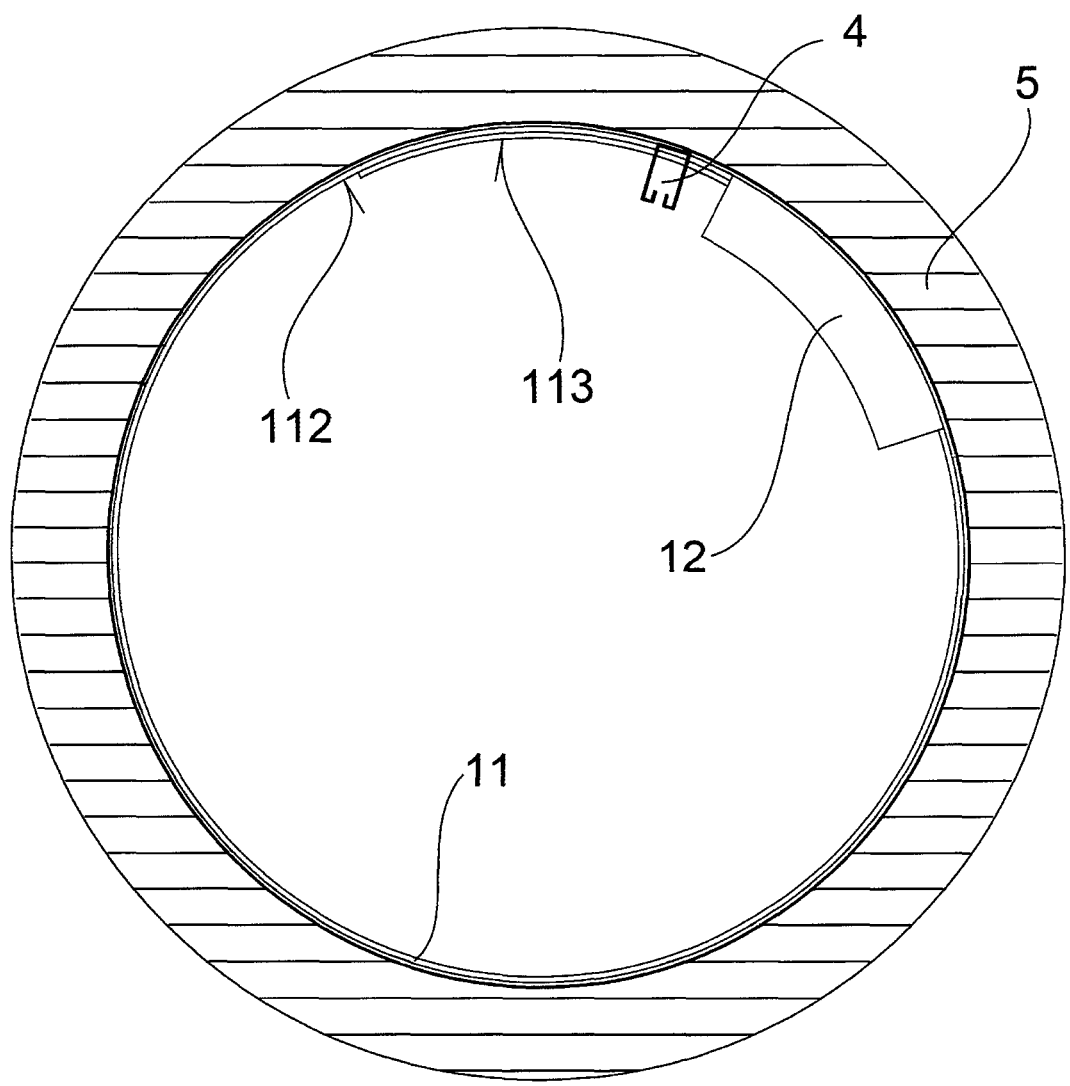
FIG. 2 is a schematic front view of a pipe with the installed pipe cable ring clamp with an optical cable holder attached thereto.
Figure 3:
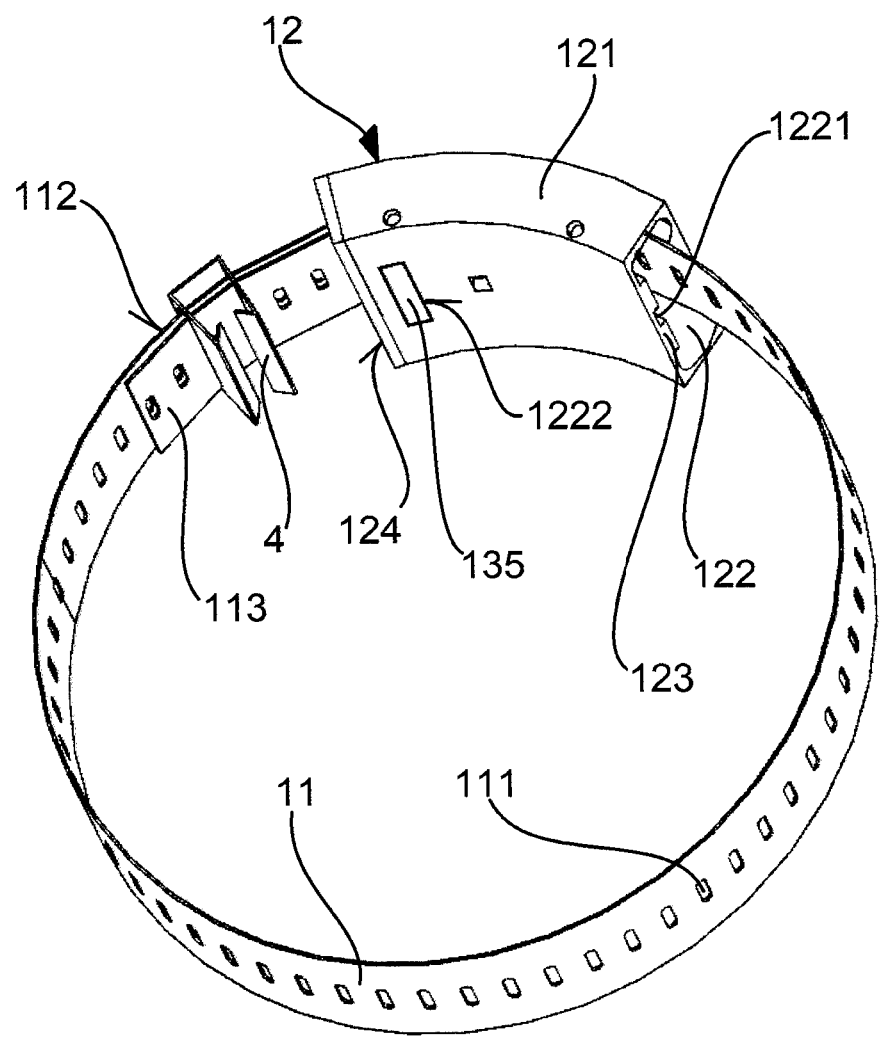
FIG. 3 is an overall front bottom perspective view of the pipe cable ring clamp itself with an optical cable holder attached thereto.
Figure 4:
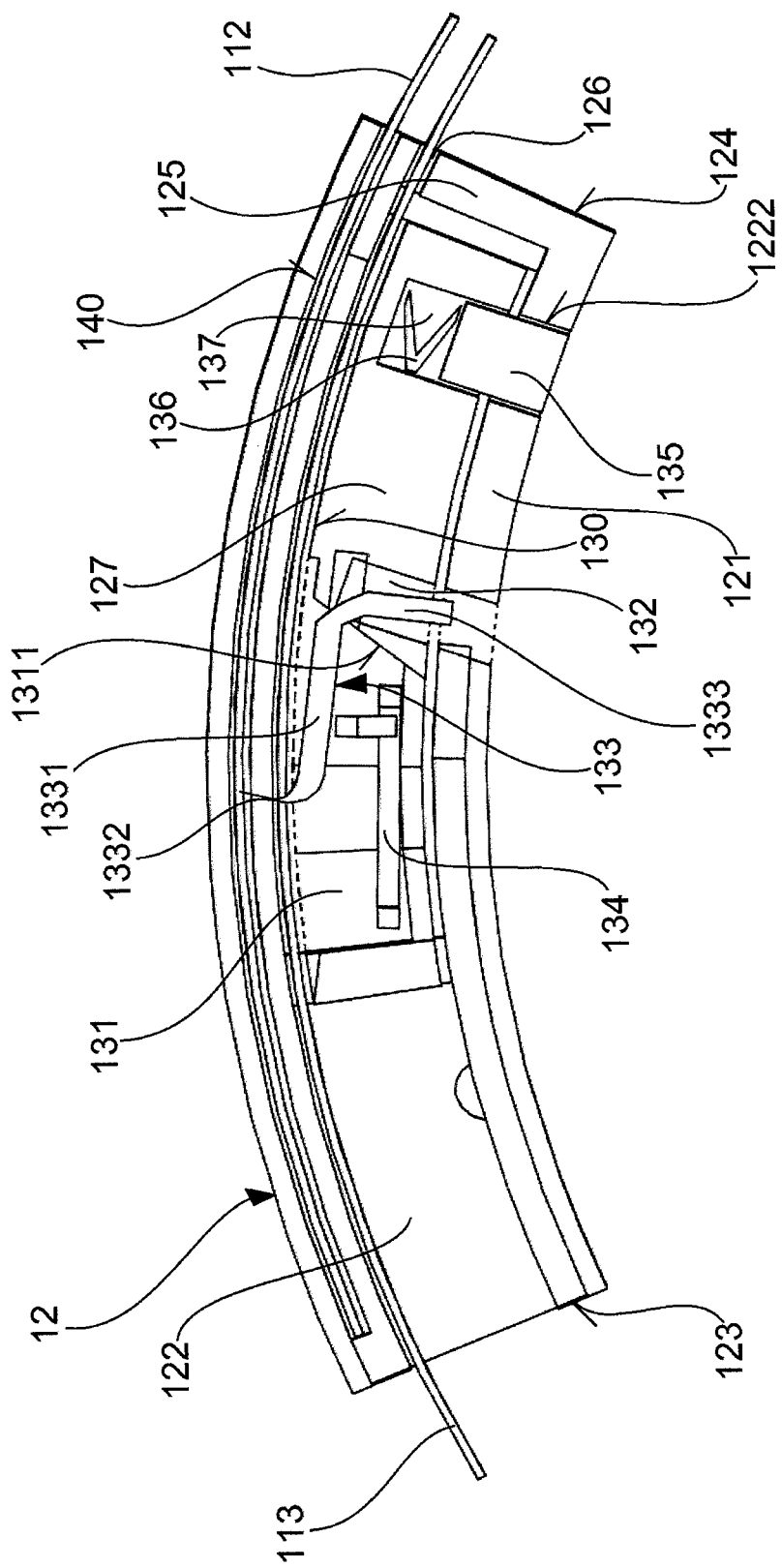
FIG. 4 is a cross-sectional view of the center of the pipe cable ring clamp lock via a vertical plane perpendicular to the longitudinal axis of the installation apparatus.
Figure 5:
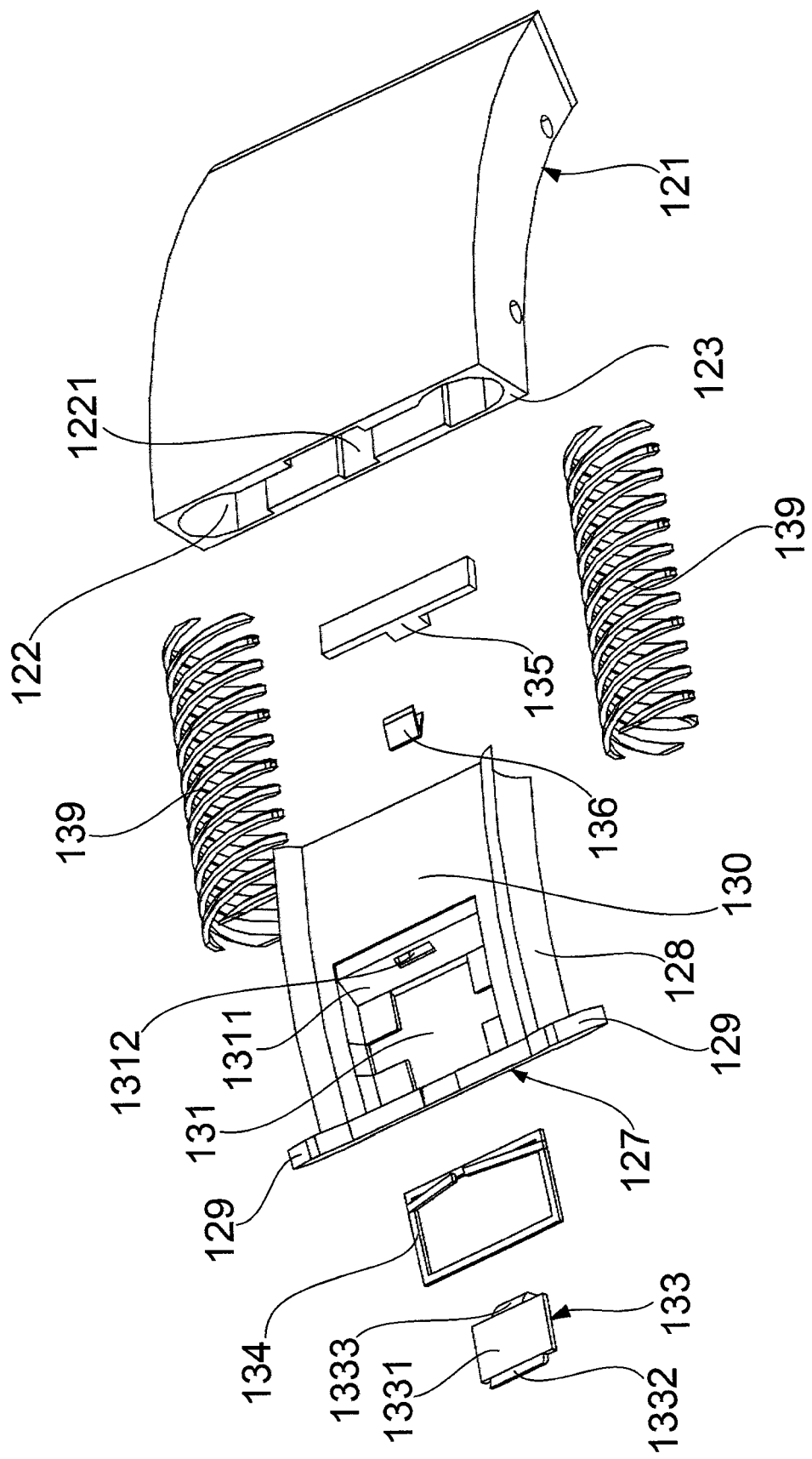
FIG. 5 is an overall axonometric top view of the pipe cable ring clamp lock.

The pipe cable ring clamp 1 as pictured in FIG. 1 is attached to the apparatus 2 for its installation. In the basic embodiment shown in FIGS. 2 and 3, the pipe cable ring clamp 1 is formed by a coiled clip band 11 and a strap lock 12, in the body of which the clip band 11 is fixed by the end of its outer coil 112, the inner coil 113 of the clip band 11 is slidably mounted in the strap lock 12 body. The clip band 11 is provided with regular transverse slots 111 in regular intervals. The cross-section of the strap lock 12 is a vertical plane perpendicular to the longitudinal axis of the apparatus 2, in the form of an annular segment, where the radius of its outer curvature corresponds to the inner radius of the pipe 5 in which the pipe cable ring clamp 1 is to be installed. The strap lock 12 shown in FIGS. 4 and 5 is formed by the lock body 121 provided with the inner cavity 122 which is open towards the lock face 123 over its entire cross-section and is closed by the rear lock wall 125 from the lock rear 124, through which a strap slot 126 is formed, connecting the inner cavity 122 with the outside. The width of the strap slot 126 corresponds to the width of the clip band 11, the inner coil of which is extended through the strap slot 126. In the inner cavity 122, is slidably mounted the movable member 127 which is provided with spring grooves 128 on both its longitudinal edges, these are terminated by spring stops 129 towards the locking face 123. The movable member 127 is provided with a strap recess 130 along the entire length of its upper surface, wherein the inner coil 113 of the clip band 11 which with its upper surface abuts the upper wall of the inner cavity 122. In the strap recess 130 area, in the movable member 127, there is the top-open tongue cavity 131, which is connected to the bottom-open anchoring cavity 132 by the tongue passage 1312 formed in its inclined rear cavity wall 1311. In the tongue cavity 131 there is a pusher tongue 133 with the longitudinal cross-section of the inverted reclining letter L, whose longer, toward the lock face 123 oriented forward arm 1331 is terminated with an upward pointed prong 1332 and the shorter downwardly directed anchoring arm 1333 is after passing through the tongue passage 1312 seated in the anchoring cavity 132, whereby the pusher tongue 133 is pivotally mounted in the tongue passage 1312. The pre-tensioned pusher element 134, which is located at the bottom of the tongue cavity 131, abuts the forward arm 1331 from below. The movable member 127 is further provided with a bottom-open latch cavity 137, wherein the latch 135 with the cross-section of a wide letter T is slidably mounted in a vertical direction, to the upper surface thereof the latch spring 136 is also adjacent, supported from the other side by the top end of the latch cavity 137. In the center of the bottom of the inner cavity 122, an open guiding groove 1221 is formed longitudinally to the lock face 123, the width of which corresponds to the width of the latch 135 foot, the depth of the guiding groove 1221 is less than the height of the latch 135 foot. The guide groove 1221 at the end thereof is opposed to the lock face 123 is terminated by the latch foot hole 1222 formed in the bottom of the inner cavity 122, wherein the dimensions of the latch hole 1222 correspond to the dimensions of the latch 135 foot with which they are compatible. Along with the movable member 127, in their spring grooves 128, in the inner cavity 122, lock springs 139 are seated and supported at one end by the spring stops 129 and the other end by the rear wall 125 of the strap lock 12. A flat strap channel 140 is formed above the inner cavity 122 in the lock body 121 open towards the lock rear 124 and closed in the opposite direction in which the outer coil 112 of the clip band 11 is anchored. On the outer coil 112 of the clip band 11, a cable holder 4 is fastened in the area behind the lock rear 124, and the inner coil 113 is seated freely slidably in the cable holder 4.

The clip band 11 of the pipe cable ring clamp 1 is in the initial state coiled and tightly adjacent the surface of the apparatus 2. The movable member 127 is pushed into its rear position when the lock springs 139 are compressed and the latch 135 foot is pressed by the latch spring 136 into the latch hole 1222, whereby the movable member 127 is fixed in the rear position. The prong 1332 of the pusher tongue 133 is thereby engaged by means of the pusher element 134 in one of the transverse slots 111 of the inner coil 113 of the clip band 11, and due to the shape of the prong 1332 and the pivotal mounting of the pusher tongue 133, it is possible to move the inner coil 113 of the clip band 11 out of the inner cavity 122 towards the lock face 123. When the latch 135 is pushed out of the latch hole 1222 from the outside of the lock body 121 into the latch cavity 137, the movable member 127 is released and pushed by the lock springs 139 through the inner cavity 122 toward the lock face 123. By means of the movable member 127, in whose the tongue cavity 131 mounted pusher tongue 133 is engaged by its prong 1332 in the transverse slot 111, the inner coil 133 of the clip band 11 is then carried outwardly from the inner cavity 122 towards the lock face 123, thereby expanding the clip band 11 which increases the diameter of its curvature and is thus pressed against the inner diameter of the pipe 5.

Figure 6:
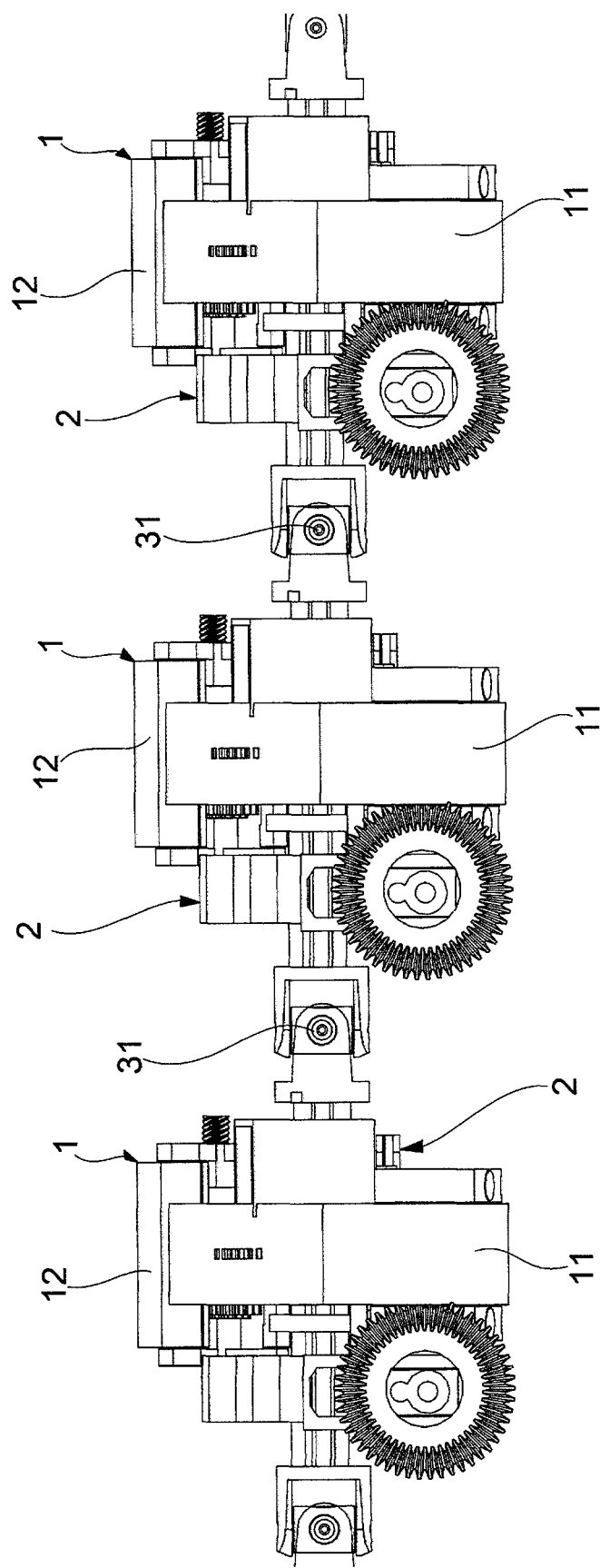
FIG. 6 is a schematic side view of a mobile robot assembly with links formed by the pipe cable ring clamp installation apparatuses with pipe cable ring clamps loaded thereon.
Figure 7:
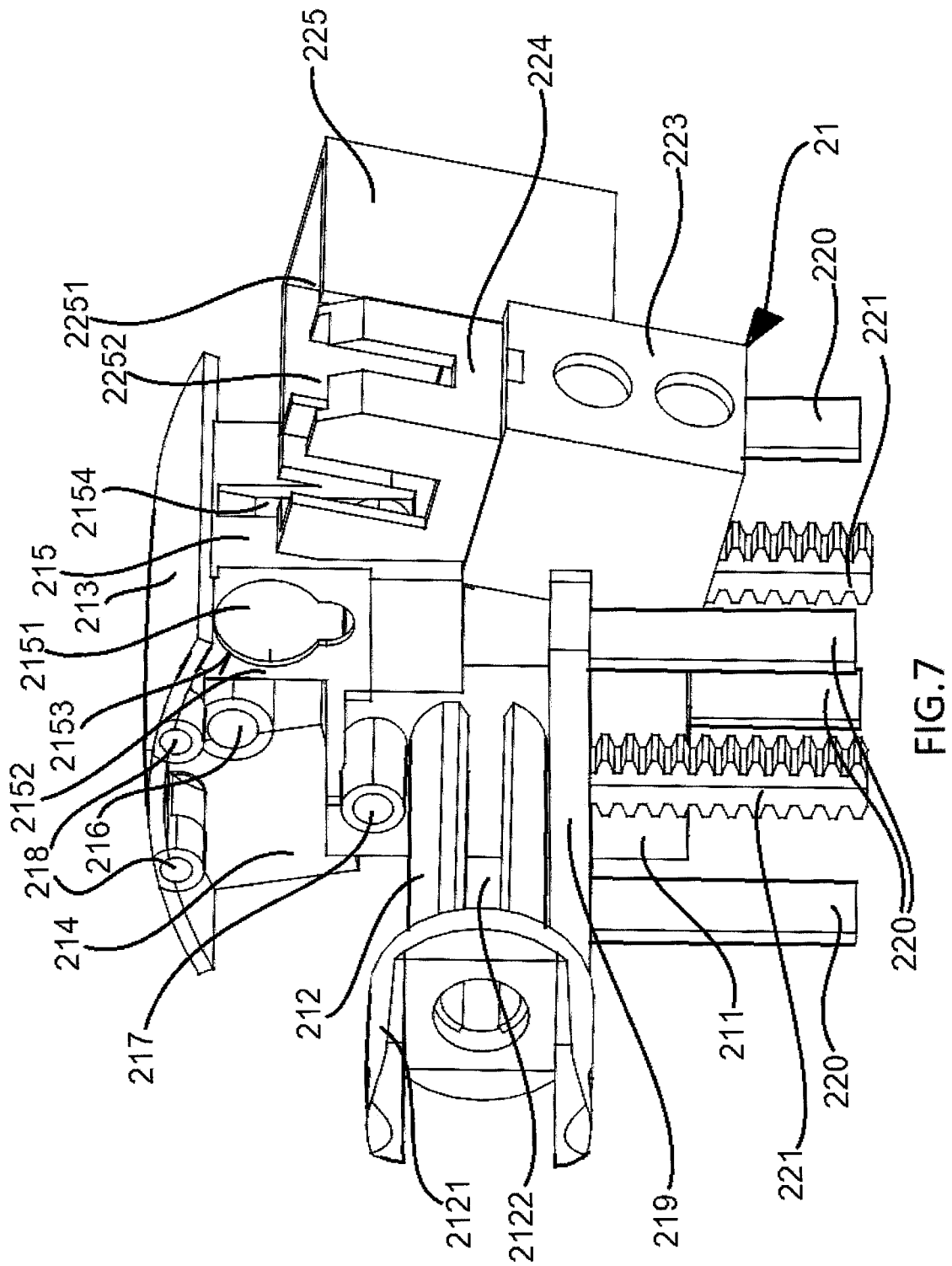
FIG. 7 is a separate front left view of the apparatus supporting body.
Figure 8:
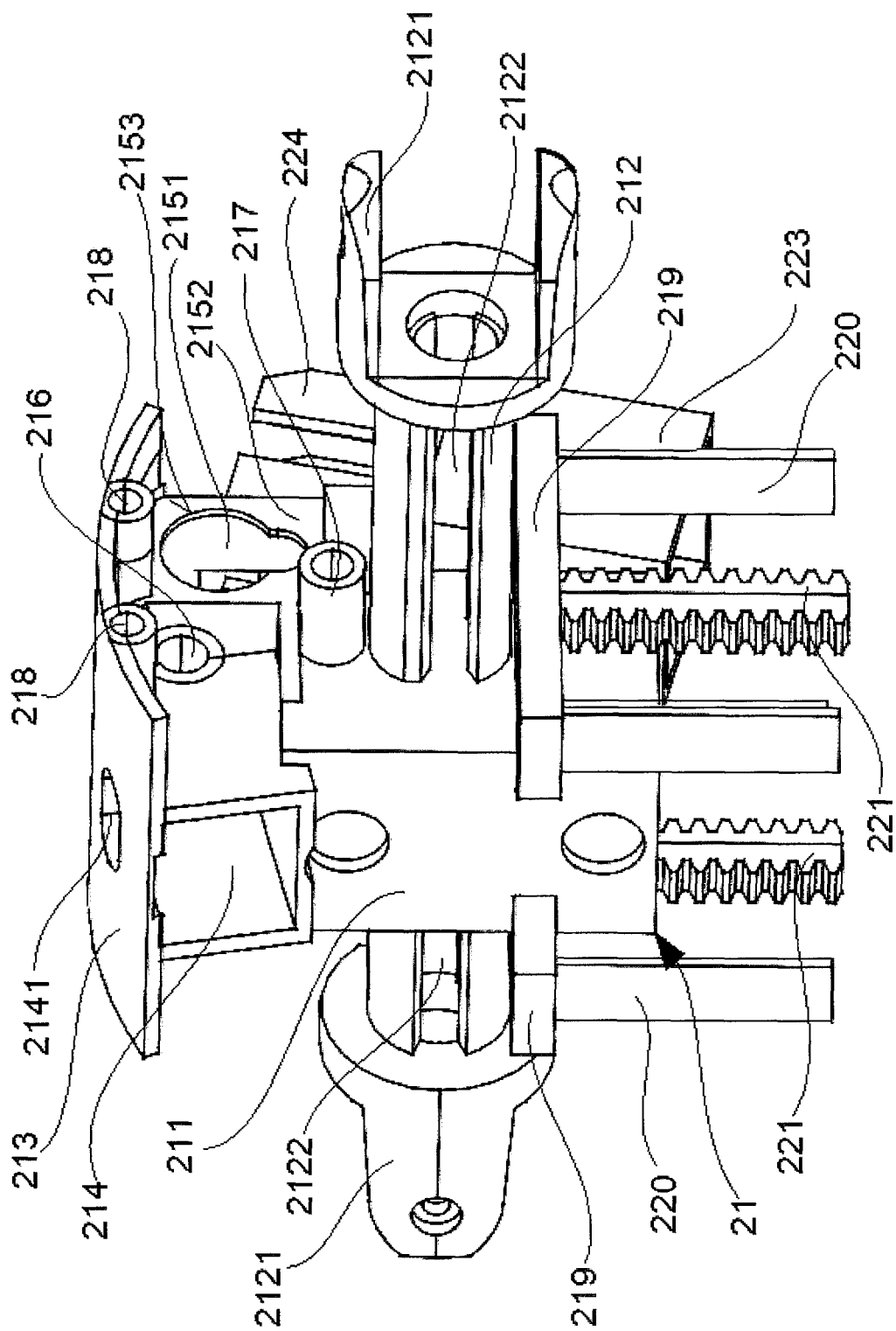
FIG. 8 is a separate right front view of the apparatus supporting body.
Figure 9:
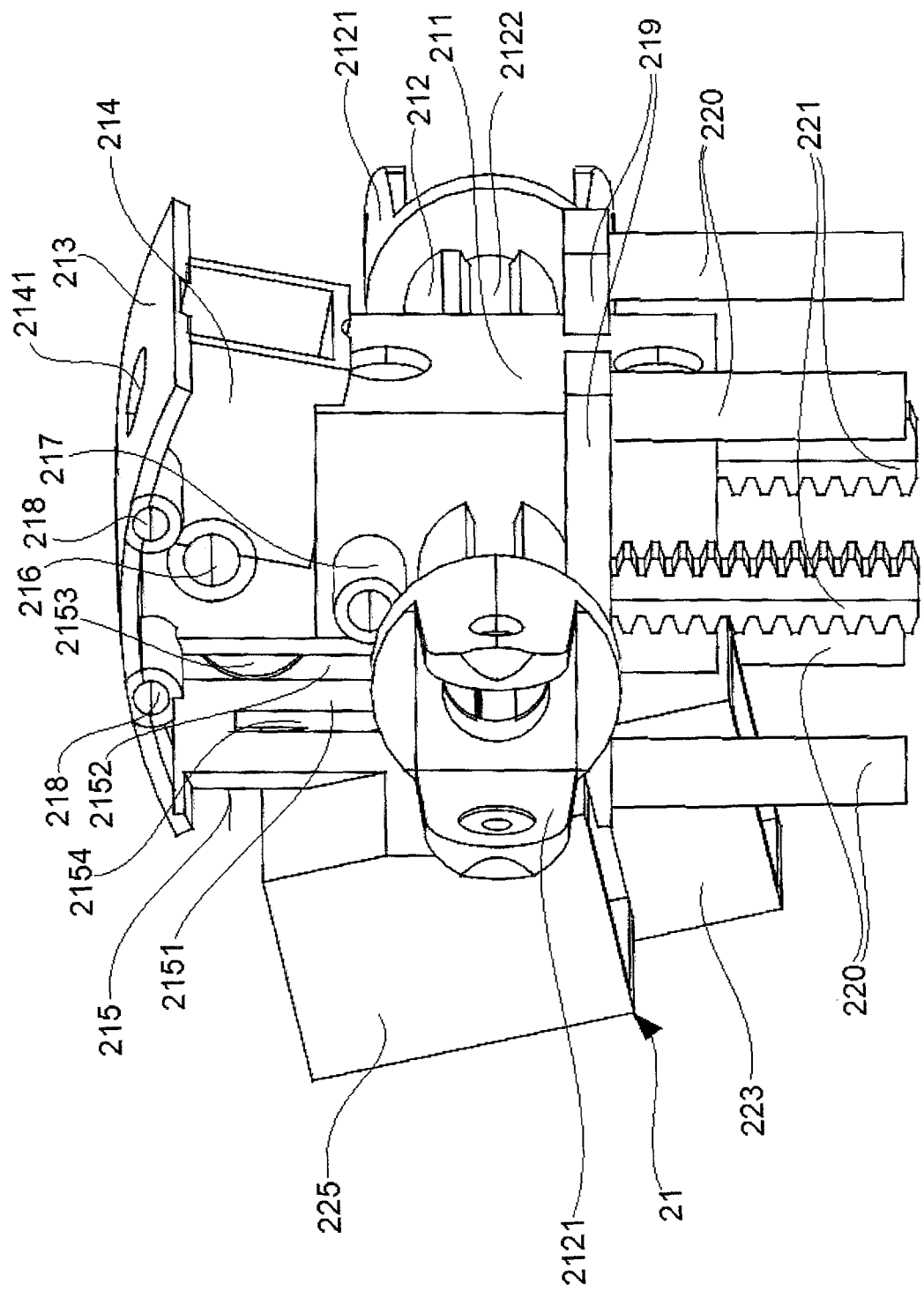
FIG. 9 is a separate right rear view of the apparatus supporting body.
Figure 10:
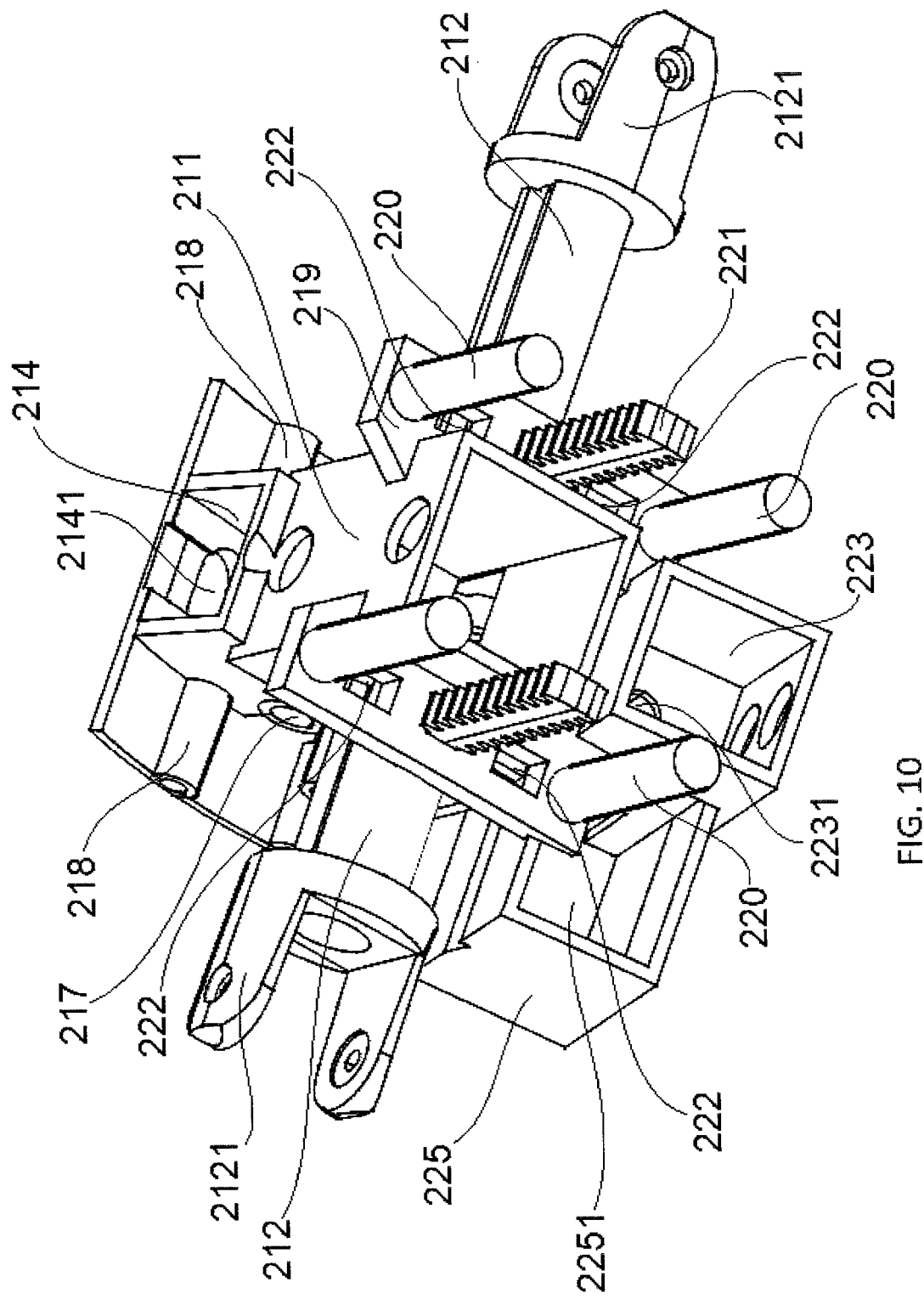
FIG. 10 is a separate lower right rear view of the apparatus supporting body.
Figure 11:
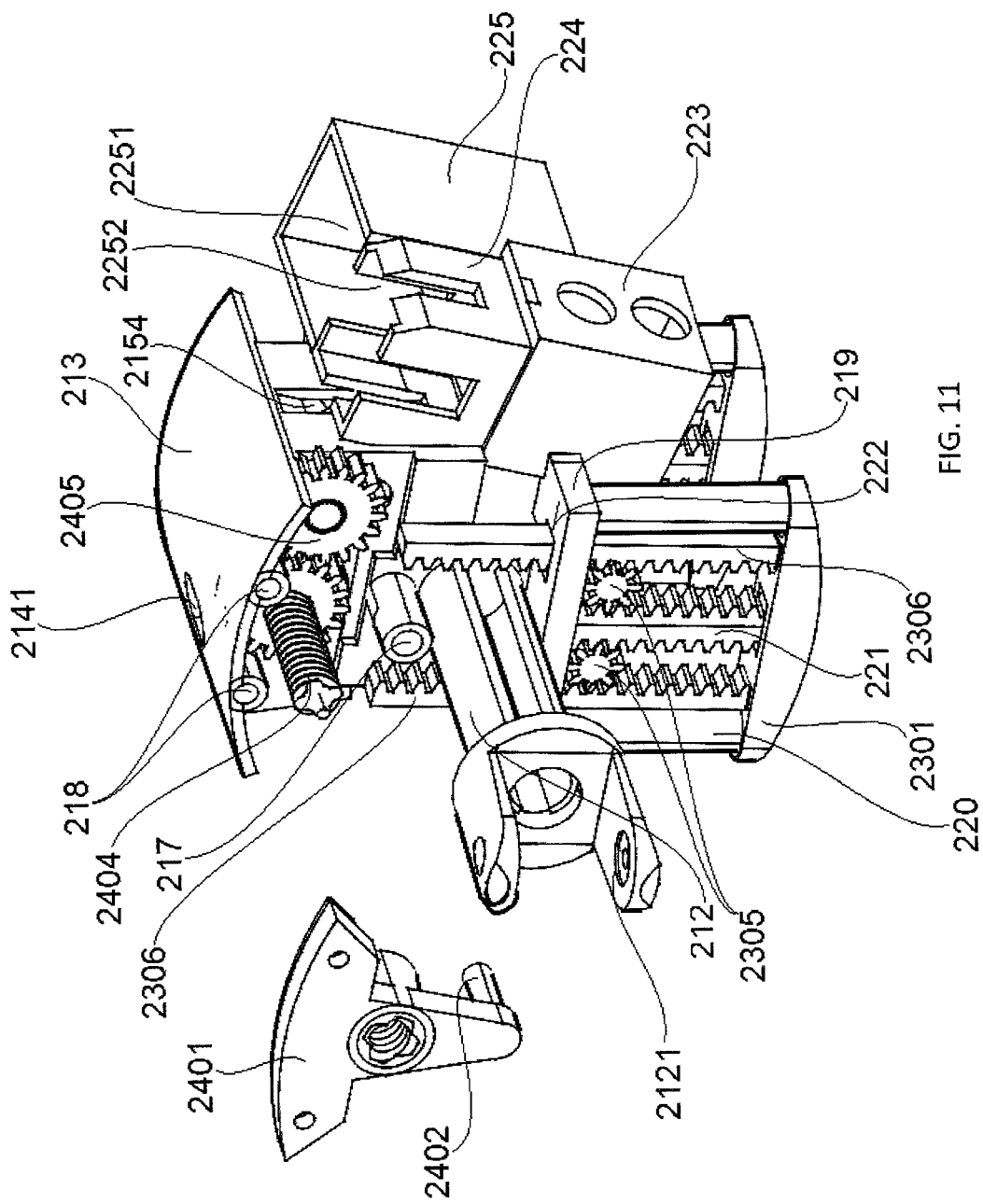
FIG. 11 is a top front left view of the apparatus supporting body with the jaw mechanism detail and the strut mechanism.
Figure 12:
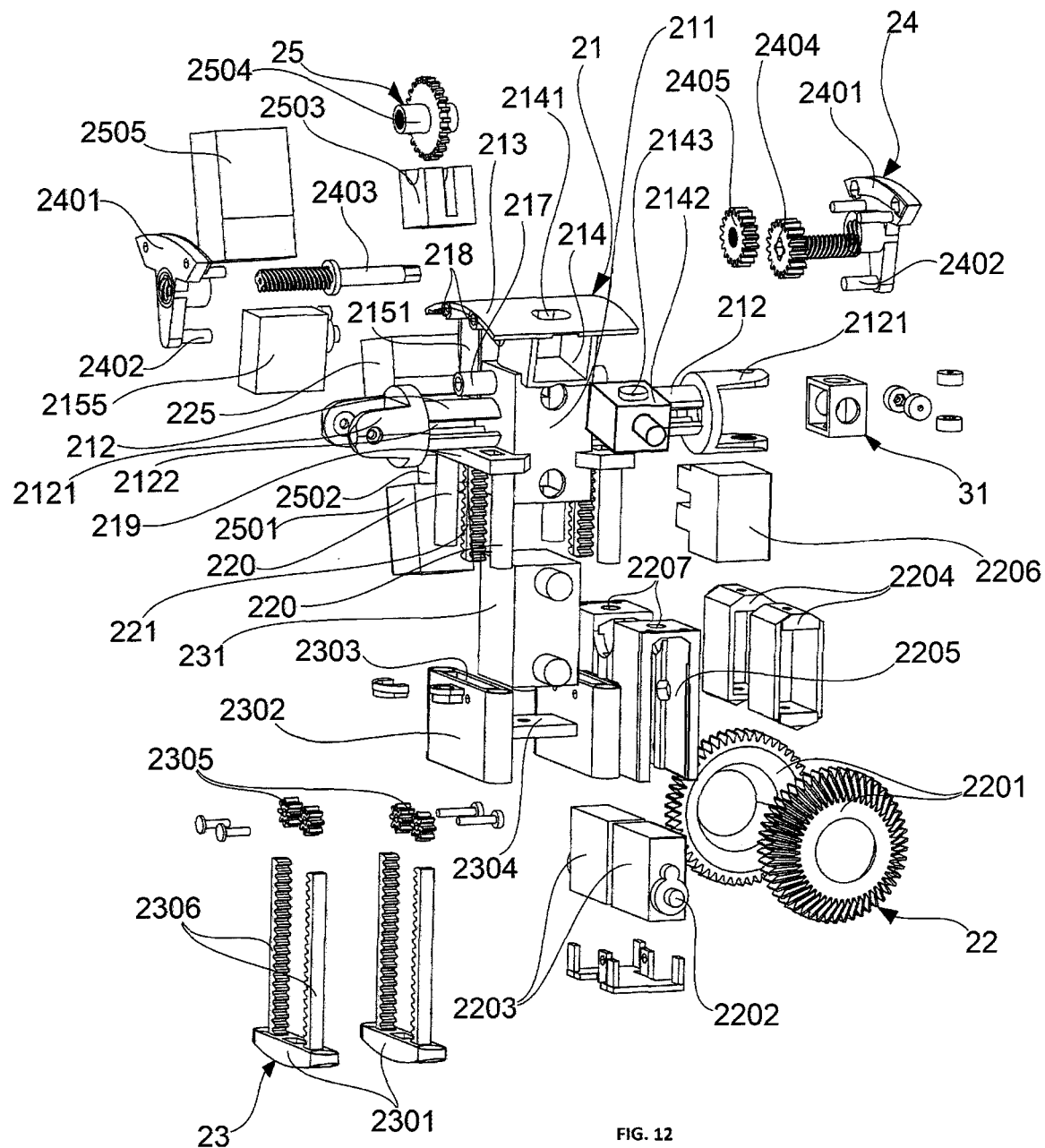
FIG. 12 is an exploded right rear view of the pipe cable ring clamp installation apparatus.
Figure 13:
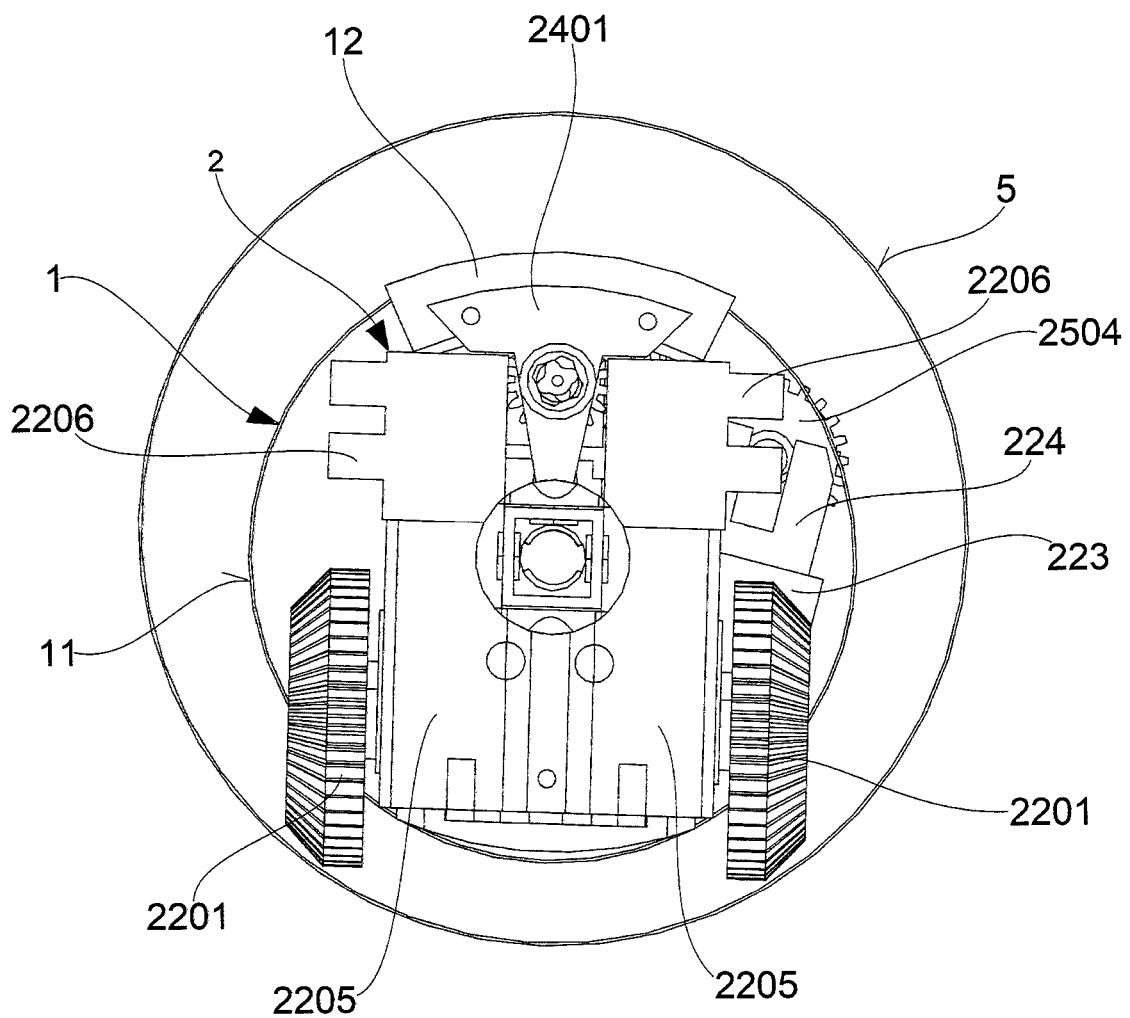
FIG. 13 is a schematic front view of a pipe with the apparatus carrying the pipe cable ring clamp with the extending struts retracted.
Figure 14:
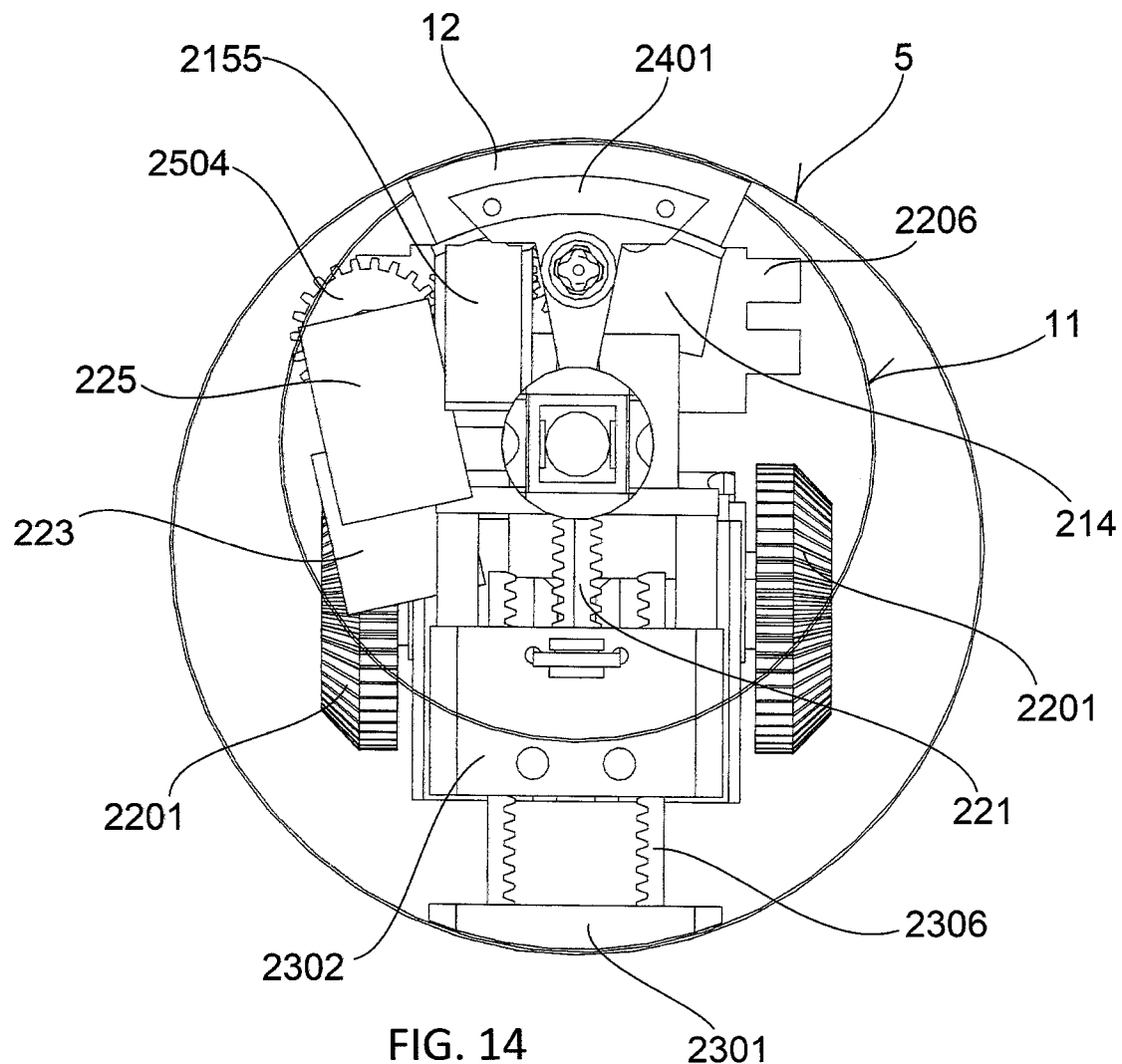
FIG. 14 is a schematic rear view of a pipe with the apparatus carrying the pipe cable ring clamp, with the extending struts extended, the band lock pressed against the pipe wall, and the clip band in a contracted position.

The apparatus 2 for the installation of a pipe cable ring clamp 1 in a pipe 5 is a part of the mobile robot 3, which include any number of units formed by the pipe cable ring clamp 1 installation apparatus 2, wherein one pipe cable ring clamp 1 is mounted on each unit of the mobile robot 3. In the preferred embodiment shown in FIG. 6, the mobile robot 3 is composed of at least two coupled units formed by a pipe cable ring clamp 1 installation apparatus 2, the individual units of the mobile robot 3 being coupled via an articulated joint 31. The apparatus 2 depicted in FIGS. 1 and 13 comprises a supporting body 21, which in its lower part is supported by an undercarriage 22 with the main movement wheels 2201 and with an extending strut mechanism 23 with extending struts 2301. In its upper part, the supporting body 21 is provided with a jaw mechanism 24 and the expanding mechanism 25 on its left side when viewed from the rear. The supporting body 21 depicted in FIGS. 7 to 10 includes a box-shaped central housing 211, which abut the horizontal longitudinally oriented central tubes 212 located in the longitudinal center axis of the mobile robot 3. The central tubes 212 are terminated by the connecting parts 2121 which are part of the articulated joint 31 and are designed as shaft parts of Cardan joint. The central tubes 212 are open towards the connecting parts 2121 and are provided with longitudinal tube slots 2122 on both sides. In its upper-end portion, the supporting body 21 is closed by a clamp bed 213, with the surface thereof shaped as a rectangular sector of a cylinder shell, whose curve is oriented transversely to the direction of the traveling robot 3. The launching chamber 214 is formed between the clamp bed 213 and the central housing 211, at the rear view in the right half of the supporting body 21, open with its entire internal cross-section in right lateral direction. The launching aperture 2141 is directed from the launching chamber 214 upward into the surface of the clamp bed 213. In the left half of the supporting body 21, the jaw chamber 215 with the inner jaw cavity 2151 is positioned beneath the clamp bed 213 and has a standing cuboid shape, whose rear is open through its entire internal cross-sectional area. In the jaw front wall 2152 of the jaw chamber 215, a circular jaw opening 2153 is formed with a circular segment shape cut-out added at the bottom. In the left side wall of the jaw chamber 215 there is a through round cut-out 2154 of the shape of a standing long rectangle. A cylindrical shaft sleeve 216 is positioned parallel to the longitudinal axis of the supporting body 21 below the clamp bed 213 in the space between the jaw chamber 215 and the launching chamber 214. Lower jaw sleeves 217 are formed in the supporting body 21, in both directions above the central tubes 212, and are designed as horizontally oriented hollow cylinders with one base adjacent to the central housing 211 and which are open through their entire inner cross-section in their directions away from the central housing 211. At least two pairs of cylindrical upper jaw sleeves 218 are formed in axes parallel to the axes of the lower jaw sleeves 217 in the same direction as the clamp bed 213, and are completely analogous to the lower jaw sleeves 217. The supporting body 21 is provided, in its lower portion below the two central tubes 212, with two horizontal rectangular transversely oriented support platforms 219 which abut against the front and rear vertical walls of the central housing 211, the footprint of which they exceed. Vertically down extending guide rods 220 of circular cross-section are fixed in each corner of the support platforms 219, with their longitudinal axes are parallel to each other. On each support platform 219, a geared guide 221 provided with teeth along the entire length of its two sides adjacent to the guide rods 220, is fixed in the same direction as the guide rods 220 directed and aligned parallel to their longitudinal axes. The two support platforms 219 are provided with two vertical strut apertures 222, each located between the guide rod 220 and the geared guide 221. The supporting body 21 is provided on its left side, viewed from the rear, with a lower clamp casing 223 and an upper clamp casing 224 in the shape of stacked cuboids with a common longitudinal vertical axis lying in the same plane as the vertical axis of the central housing 211, where the two axes form an angle in the range of 10° to 30°; the plane of the two axes being simultaneously perpendicular to the longitudinal horizontal axis of the supporting body 21. The lower clamp casing 223 is located in the central portion thereof, between the support platforms 219 which are adjacent thereto from the front and the rear. The unlabeled inner cavities of the lower clamp casing 223 and the upper clamp casing 224 are interconnected by the piston opening 2231. Rectangular cut-outs are formed in all four side-walls of the upper clamp casing 224 from their upper edges with a cut-out made towards the center of the supporting body 21 with its size and location corresponding to the round cutout 2154 and thereby forming a common through hole. A cuboid-shaped motor housing 225 abuts against the rear wall of the upper clamp casing 224 and partially also the lower clamp casing 223, in its upper part, wherein the motor cavity 2251 is open from above and below. From the side of the upper clamp casing 224, the wall of the motor housing 225 is provided with a rectangular shaft slot 2252 extending from its upper edge, the dimensions and location thereof corresponding to the cut-out provided in the side wall of the upper clamp casing 224 adjacent to the motor housing 225, whereby the inner cavities thereof are linked. On each pair of guide rods 220 mounted on the same support platform 219, a flat, movable in the vertical direction, strut housing 2302 is mounted, provided with vertically through housing cavity 2303, wherein the geared guide 221 is inserted. The two strut housings 2302 are connected to each other by the housing bridge 2304. In the housing cavity 2303, two strut gears 2305 are placed, freely rotating on a horizontal axis parallel to the longitudinal axis of the supporting body 21, so that each of them abuts one side of the geared guide 221, the teeth thereof they engage. To the strut gears 2305, from side opposite to the geared guide 221, abut the geared strut posts 2306, which are inserted vertically in the housing cavity 2303 and which pass through strut apertures 222 above the strut housings 2302, and are connected at their lower ends by extending struts 2301. The horizontal transverse dimension of the housing cavity 2303 is determined by the sum of the corresponding dimensions of the strut posts 2306, the strut gears 2305 and the geared guides 221. A linear strut motor 231 is mounted in the central housing 211 and is coupled by a piston (not shown) to the housing bridge 2304. The jaw mechanism 24 is formed by two opposing jaws 2401 adjacent to the front and rear edges of the clamp bed 213, the upper edge thereof they exceed and the whose curvature their shape copies. The jaws 2401 are mounted by their jaw pins 2402 slidably in opposition to one another in the horizontal longitudinal axis in the upper jaw sleeves 218 and in the lower jaw sleeves 217. The jaw chamber 215 accommodates the jaw drive 2155 which is coupled to the jaws 2401 via the shaft (not shown) mounted jaw pinion 2405 and the jaw front threaded shaft 2404 and the rear threaded shaft 2403. In the lower clamp casing 223 of the expanding mechanism 25 is mounted the lifting drive 2501, whose lifting piston 2502 passes through the piston opening 2231 into the inner cavity of the upper clamp casing 224, where the gear seat 2503 is slidably in a vertical direction mounted and fixed to the lifting piston 2502. In the gear seat 2503, the clamp gear 2504 is seated freely on the axis parallel to the longitudinal axis of the supporting body 21, the unlabeled teeth of which correspond to the transverse slots 111 of the clip band 11. The clamp gear 2504 is mounted on a support axis (not shown) of the expansion drive 2505, which is freely, slidably in the vertical direction, mounted in the motor housing 225. The launching drive 2142 is mounted in the launching chamber 214, which is provided with the extendable launching pin 2143 whose dimensions and location on the launching drive 2142 surface correspond to the dimensions and location of the launching aperture 2141. The undercarriage 22 of the apparatus 2 is formed by the main movement wheels 2201 seated on the wheel shafts 2202 of the drive motors 2203 mounted in the wheel housings 2204, which are horizontally slidably mounted in the lateral and lower direction open undercarriage housings 2205 fixed to the unlabeled front vertical surface of the strut housing 2302. The lifting motors 2206 are coupled to the tops of the undercarriage housings 2205, which are coupled to the wheel housings 2204 by means of pistons (not shown) extending in the vertical direction through the undercarriage piston aperture 2207 formed in the tops of the undercarriage housings 2205.

The mobile robot 3 moves on its main movement wheels 2201 through the pipe 5 and the pipe cable ring clamp 1 is supported by its strap lock 12 on the clamp bed 213 of the apparatus 2 so that the position of the latch hole 1222 corresponds to the position of the launching aperture 2141, the strap lock 12 is on the clamp bed 213 clamped between jaws 2401. At the point designated for attaching the pipe cable ring clamp 1, the mobile robot 3 stops, the apparatus 2 carrying the pipe cable ring clamp 1 by means of the strut motor 231 extends the extending struts 2301, whereby the apparatus 2 is lifted until the strap lock 12 is pressed with its top surface against the inner surface of the pipe 5. Concurrently with the lifting drive 2501, the expansion drive 2505 is activated, which by rotating the clamp gear 2504 pushes the inner coil 113 of the clip band 11 in whose transverse slots 111 the teeth of the clamp gear 2504 are engaged, out of the inner cavity 122 towards the lock face 123, thereby increasing the diameter the clip band 11 until entire outer circumference thereof is pressed to the inner surface of the pipe 5. Next, the launching drive 2142 with its firing pin 2143 passing through the launching aperture 2141 pushes the latch 135 into the inner cavity 122 of the strap lock 12, thereby fixing the pipe cable ring clamp 1 in the pipe 5 and then actuating the jaw drive 2155 to move the jaws 2401 away from the strap lock 12, thereby releasing it. The apparatus 2 then retracts the extending struts 2301 and rests back on the main movement wheels 2201 and the mobile robot 3 continues to move through the pipe 5.

INDUSTRIAL APPLICABILITY

Pipe cable ring clamp and the series of apparatus for its installation are useful in introducing data lines, especially high-speed fiber optic cables, into buildings and homes without the need for excavation using existing waste lines or other available pipelines.

LIST OF REFERENCE SIGNS 1 pipe cable ring clamp
2 Apparatus
11 clip band
12 strap lock
112 outer coil
113 inner coil
111 transverse slots
121 lock body
122 inner cavity
123 lock face
124 lock rear
125 rear wall
126 strap slot
127 movable member
128 spring grooves
129 spring stops
130 strap recess
131 tongue cavity
1312 tongue passage
1311 rear cavity wall
132 anchoring cavity
133 pusher tongue
1331 forward arm
1332 prong
1333 anchoring arm
134 pusher element
137 latch cavity
135 latch
136 latch spring
1221 guiding groove
1222 latch hole
139 lock springs
140 strap channel
3 mobile robot
31 articulated joint
21 supporting body
22 undercarriage
2201 main movement wheels
23 strut mechanism
2301 extending struts
24 jaw mechanism
25 expanding mechanism
211 central housing
212 central tube
2121 connecting parts
2122 tube slots
213 clamp bed
214 launching chamber
2141 launching aperture
215 jaw chamber
2151 jaw cavity
2152 jaw front wall
2153 jaw opening
2154 round cutout
216 shaft sleeve
217 lower jaw sleeve
218 upper jaw sleeve
219 support platform
220 guide rods
221 geared guide
222 strut aperture
223 lower clamp casing
224 upper clamp casing
2231 piston opening
225 motor housing
2251 motor cavity
2252 shaft slot
2302 strut housing
2303 housing cavity
2304 housing bridge
2305 strut gear
2306 strut posts
231 strut motor
2401 jaws
2402 jaw pins
2155 jaw drive
2405 jaw pinion
2403 rear threaded shaft
2404 jaw front threaded shaft
2501 lifting drive
2502 lifting piston
2503 gear seat
2504 clamp gear
2505 expansion drive
2142 launching drive
2143 launching pin
2202 wheel shafts
2203 drive motor
2204 wheel housings
2205 undercarriage housings
2206 lifting motors
2207 undercarriage piston aperture
4 cable holder
5 pipe

The invention claimed is:
1. A pipe cable ring clamp comprising a coiled flat clip band provided with transverse slots on which at least one cable holder is attached including an outer coil and an inner coil, and a strap lock wherein the clip band is fastened, and the inner coil of the clip band is slidably mounted in the strap lock and the strap lock includes lock springs coupled with the inner coil of the clip band, characterized in that the lock springs being mounted in the strap lock along edges of the clip band outside the contour of a perpendicular projection of the lock spring into a cylindrical surface of a pipe, the lock springs are coupled to the inner coil of the clip band by means of a movable member mounted slidably in the strap lock, wherein the movable member is provided with spring stops on an opposite rear wall of the strap lock by the spring stops wherein the lock springs rest with one end, while the other end is supported by the rear wall of the strap lock and wherein the movable member is coupled to the inner coil of the clip band by means of a pusher tongue pivotally mounted in the movable member, wherein the movable member is adapted both to fix the inner coil in a rear position when the lock springs are compressed, and to release the inner coil by means of a latch slidably mounted in a vertical direction in a body of the movable member.

2. The pipe cable ring clamp, according to claim 1, characterized in that a cross-section through a center of the strap lock by a vertical plane perpendicular a longitudinal axis of the pipe is in the form of an annular segment, wherein the strap lock is provided with an inner cavity, wherein the movable member is slidably mounted.

3. The pipe cable ring clamp, according to claim 1 characterized in that the pusher tongue which is pivotally mounted in the movable member is, at an end of the pusher tongue facing the end of the movable member provided by the spring stops, provided with a prong which is engaged in one of the transverse slots of the clip band, wherein the pusher tongue is pushed upwardly by a pre-tensioned pusher element mounted in the movable member.

4. The pipe cable ring clamp, according to claim 1, characterized in that the latch is vertically slidably mounted in a bottom-open latch cavity formed in the movable member where an upper surface of the latch abuts, in the latch cavity, also disposed a latch spring wherein a through latch hole is formed in the bottom of the inner cavity, the dimensions thereof correspond to the dimensions of the respective latch portion with which the latch cavity is compatible.

5. A series of pipe cable ring clamp installation apparatuses, each comprising the pipe cable ring clamp, according to claim 1, which is adapted to move through the pipe and which includes a supporting body and an expanding mechanism with a clamp gear, characterized in that the individual apparatuses can be coupled together by articulated joints in any number of units, wherein the supporting body of each apparatus is provided with a clamp bed for receiving the strap lock of the pipe cable ring clamp, wherein the strap lock is fixed on the clamp bed by being gripped between jaws of a jaw mechanism, wherein the shape and dimensions of the clamp bed correspond to the shapes and dimensions of the strap lock of the pipe cable ring clamp, and wherein a launching drive is mounted under the clamp bed for fastening the pipe cable ring clamp in the pipe, and in the clamp bed, a through launching aperture is formed with dimensions and position thereof corresponding to the latch of the movable member of the strap lock of the pipe cable ring clamp and the launching drive provided with a launching pin, the dimensions and positioning thereof correspond to the dimensions and position of the launching aperture, the apparatus being provided with an extending strut mechanism with at least one extending strut.

6. The series of apparatuses according to claim 5, characterized in that the jaw mechanism is formed by the two opposing jaws disposed counter-slidably in an axis parallel to the longitudinal axis of the apparatus, where the jaws about a front edge and a rear edge of the clamp bed, an upper edge of which the two opposing jaws exceed, and are coupled to a jaw drive housed in the supporting body of the apparatus.

7. The series of apparatuses according to claim 5, characterized in that the supporting body is provided with an undercarriage coupled thereto and which is provided with main movement wheels seated on a wheel shafts of drive motors, which are disposed relative to the supporting body independently of each other in the vertical direction, vertical movement thereof being controlled by lifting motors.

\* \* \* \* \*